United States Patent Office 3,737,506
Patented June 5, 1973

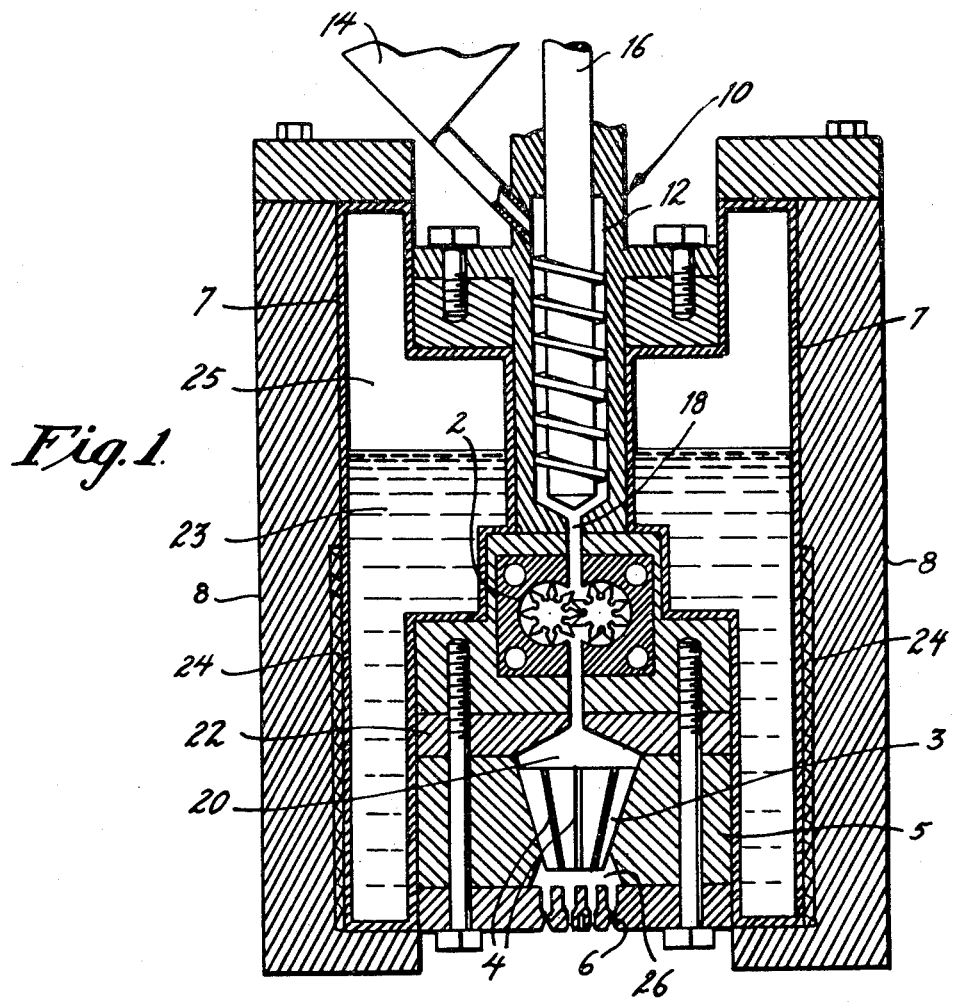
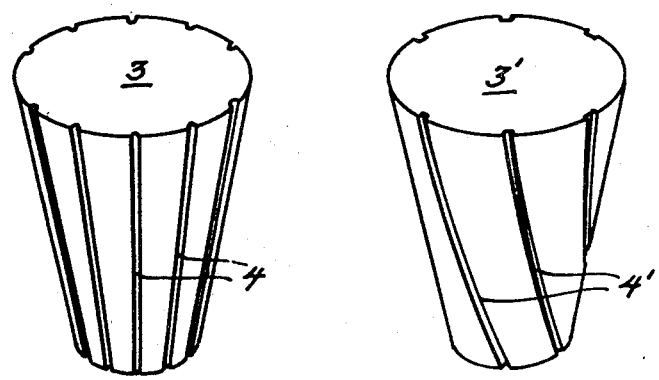

3,737,506
PROCESS AND APPARATUS FOR CONTINUOUS EXTRUSION OF HIGHLY-VISCOUS MELTS
Horst G. Martin, Zug, and Ulrich P. Feer, Nidwalden, Switzerland, assignors to Societe de la Viscose Suisse, Emmenbrucke, Switzerland
Filed Apr. 3, 1970, Ser. No. 25,480
Int. Cl. D01f 7/00
U.S. Cl. 264—176 F      11 Claims

ABSTRACT OF THE DISCLOSURE

Apparatus and method of continuously extruding filaments of highly-viscous polymer melts are provided using a truncated cone with surface grooves. The base end of the grooves communicates with a high pressure pump exercising a pressure of 300–1100 atmospheres, and the other end of the grooves communicates with the spinnerette. While flowing through the grooves, the melt temperature increases 5° C. to 60° C. without introducing any external heat.

---

This invention relates to a process and apparatus for continuous extrusion of highly-viscous melts, especially of spinnable linear high polymers of high viscosity.

It is known that the extrusion of spinnable polymers of high viscosity, such as, for example, polyesters and polyamides, requires melts of rather high temperature, if optimal filament qualities are to be obtained. If the spinning temperature of the polymers is too low, their melt-viscosity remains too high, and the filaments spun from such polymers have a spin-orientation which is too high to allow subsequent drawing at sufficiently high draw ratios to produce drawn filaments of high tenacity. It is also known that, in order to obtain filaments of good quality, the polymer should not contain any crystallization nuclei, but the complete melting of such nuclei often requires temperatures being substantially above the melting point of the polymer. For example, in the case of polyethylene terephthalate having a melting point of about 260° C., it has been observed that a temperature of 280° C. was needed to make all crystallization nuclei to disappear.

It is therefore necessary that the viscous materials have a high temperature when they are extruded through dies, spinnerettes and the like, but it is also desired that the materials are heated to that high temperature only shortly before extrusion, in order to limit the time during which any appreciable heat degradation could occur.

Various proposals have been made to obtain the desired effect. Thus, British Pat. 1,165,927 proposes a device for melt-spinning of high polymers, wherein the conveyance installations are kept at a temperature substantially lower than the spinning temperature, and the melt is heated to the required temperature by passing through a separately heated box immediately before the spinnerette plate. To compensate for any loss of heat by radiation from the spinnerette plate, additional heat is supplied by radiation heating plates arranged parallel to the extruded filaments. The heating box has a substantially higher temperature than the extruded melt, and, according to Swiss Pat. 469,819, such a device is not practical, because the polymer passes so slowly through the heating box that it is overheated and suffers degradation.

Swiss Pat. 469,819 therefore suggests a process, wherein a polymer melt conveyed to the spinnerette at a rather low temperature, is heated while passing through the channels of the directly heated and heat-isolated spinnerette plate. The temperature of the spinnerette channels is so high that the temperature of the passing polymer is increased by at least 60° C. on its way from the channel inlet to the channel outlet. Such a strong heating along a very short distance produces however a high temperature gradient in the melt which is unfavorable for obtaining filaments of uniform qualities.

To avoid melts which have been strongly heated from the outside so as to contain layers of different temperature and viscosity, various proposals have been made to obtain a thorough mixture and homogenization by passing the melt through perforated plates or plate aggregates with deviation arrangements, or plates with channels of varying cross-sections or differently arranged inlets and outlets. All such devices however provide only for maintenance of a melt temperature already existing when the melt enters the mixing apparatus.

It is the object of this invention to provide a process and apparatus for continuous extrusion of highly-viscous melts, wherein the temperature of a flowing melt is raised, immediately before extrusion, by means other than heat supply from the outside in order to obtain an extruded material which is of uniform composition and which has not suffered any substantial heat-degradation. In this context, "highly-viscous melts" means melts having a viscosity of at least 1,000 poises, immediately before being processed according to the invention.

A special object is the application of the inventive process and apparatus to the preparation of spun filaments from linear high polymers of high viscosity, said filaments having a good uniformity and being suitable for drawing at high draw ratios in order to produce filaments and yarns of high tenacity.

The invention provides a process for continuous extrusion of highly-viscous melts, wherein the temperature of a flowing melt is raised before extrusion by increasing the inner friction of the melt, which comprises passing a melt having a viscosity of at least 1,000 poises, immediately before extrusion, through narrow channels being straight or slightly curved and having a uniform cross-section along their length, under such conditions that the pressure of the melt at the entry to the channels is 300 to 1,100 atmospheres higher than the pressure of the melt at the exit of the channels, and that the heat generated in the melt is substantially retained by the melt while passing through the channels, and finally extruding the melt.

The pressure exercised on viscous melts flowing through narrow, capillary-like channels, is essentially transformed into heat generated by the inner friction between the laminar layers of the melt. The temperature rise of the melt depends on the pressure applied and the specific heat of the molten material. The pressure is in proportion to the viscosity of the molten polymer, the throughput of the melt, and the length of the channels, and is in reverse proportion to the size of the cross-sections and the number of the channels.

The viscosity of the molten polymer is given by the nature of the polymer used, while pressure and throughput are determined by the extrusion installations and the type of end product desired. The only remaining possibility to regulate the pressure is therefore by changing the number and dimensions of the narrow channels of the apparatus through which the melt is flowing. As the number and length of the channels is usually determined by the apparatus used, regulation of the pressure is, in practice, done by variation of the size of the cross-sections of the channels. The invention also provides an apparatus, which will be described in detail further below, and which easily permits to adapt the cross-sections of the channels to the requirements of the process. The pressure difference of the melt between the points of entry to, and exit from, the channels shall be between 300 and 1,100 atmospheres, depending on the nature of the molten material used and the type of extrusion product desired.

As the melt also shows a pressure difference when passing through the channels and capillaries of the spinnerette, the pressure difference between the entry and exit of the inventive apparatus corresponds to the pressure applied less the pressure difference in the spinnerette, as described in detail below.

It should be noted that, in the case of thermoplastic polymers, the inner friction of the melt mentioned above, may have another desired result, in that it can produce thixotrophic effects, i.e. a temporary reduction of the melt-viscosity in addition to the viscosity reduction produced by the temperature rise.

The invention is of special advantage for processes requiring a lower melting temperature and a substantially higher extrusion temperature, to avoid chemical reactions in the melt during the time between melting and extruding, reactions which may result in polymerization, reticulation, or de-polymerization, and which may, for example, also effect the degree of whiteness of the extruded materials. On the other hand, as already stated, when spinning filaments, a higher extrusion temperature will produce primary filaments of lower orientation which can be drawn at a higher draw ratio and will provide filaments of higher tenacity.

The invention is advantageous for materials which can only be extruded at temperatures substantially higher than their melting point.

Materials to which the inventive process can be applied are, for example, thermoplastic polymers, such as polyesters, polyamides, polyurethanes, polyether-esters, polyolefins or polyvinyl compounds, both for making films, rods, sheets, and for making filaments by melt-extrusion. The process is also applicable to extrudable inorganic polymers having comparable melt-viscosities.

To demonstrate the rise of temperature generated under pressure by the inner friction of a flowing melt, polycaprolactam of a relative viscosity of 65 (determined as described below) was molten in an extruder and was passed under a pressure of 320 atmospheres through a capillary of 50 millimeters length and 2 millimeters diameter. Tests were made with two melts having different initial temperatures with the following results:

Temperature Rise in a Flowing Melt Under Pressure in ° C.

| Melt temperature at capillary entry | Melt temperature at capillary exit | Temperature rise |
| --- | --- | --- |
| 255 | 280 | 25 |
| 270 | 296 | 26 |

The apparatus used to perform the invention consists of a truncated cone with its base, i.e., its larger circular plane, at the top, having on its curved surface straight or slightly curved grooves running from top to bottom, the radius of curvature of any curves formed by the grooves being, at any point of said curves, at least ten times the width of the grooves, the cone being surrounded by a support of smooth conical inside fitting tightly to the cone, leaving only the grooves on its curved surface free for the flowing melt, the cone and the support being made of a material which has a specific heat conductivity not exceeding 0.06 gcal. per cm./sec./° C. at a temperature of 20° C.

The specific heat conductivity of cone and support shall not exceed the prescribed value, so that the heat generated by the inner friction of the flowing melt substantially remains in the melt and serves to raise its temperature and is not conducted to the outside. Suitable materials are, for example, ceramic products and chromium-nickel steel alloys. The materials shall also have a very low heat expansion coefficient, and shall be resistant to the temperatures used and to the melts employed. Come and support can also be made of different materials.

The truncated cone and the conical support shall have the same cone angle, so that, under the pressure of the flowing melt, cone and support fit closely together, leaving only the grooves on the surface of the cone free for the flowing melt. Such a close fitting will guarantee a perfect sealing which also remains intact, when the apparatus is in permanent use during a prolonged period. To allow an easy removal of the cone from the support, the taper or cone angle shall preferably be not less than 25°.

The grooves of the cone may be straight or slightly curved as prescribed to avoid obstacles or sharp bendings in the way of the flowing melt. The cross-sections of the grooves may have different forms, and may, for example, be half-round, half-oval, square, or rectangular. Rectangular cross-sections are preferred, because they allow an easy adjustment of their size.

By adjusting the size of the cross-sections of the grooves, the apparatus according to the invention can easily be adapted to different process conditions. A higher throughput can be effected by increasing the width and/or depth of the grooves by milling. On the other hand, a higher pressure difference and thereby a higher rise of the melt temperature can be obtained by decreasing the cross-section of the grooves by means of turning or grinding the surface of the conical inset.

A further advantage of the apparatus according to the invention is that it can easily be taken apart and cleaned. This is especially desirable when using polymers which tend to form reticulations at higher temperatures, such as, for example, nylon 66.

For the purpose of illustrating the invention, there are shown in the drawings forms which are presently preferred; it being understood, however, that this invention is not limited to the precise arrangements and instrumentalities shown.

FIG. 1 is a schematic sectional view of the apparatus of the present invention.

FIG. 2 is a perspective view of the cone illustrated in FIG. 1 but on a larger scale.

FIG. 3 is a perspective view of another cone, which can be used in FIG. 1.

Referring to FIG. 1, there is illustrated schematically an apparatus in accordance with this invention. An extruder 10 is provided with a barrel 12 communicating with a supply hopper 14. The screw 16 preplasticizes the polymer and discharges through nozzle 18 to the inlet of pump 2. The outlet from pump 2 communicates with chamber 20. Chamber 20 is defined by the large diameter end of truncated cone 3, the cavity in pressure plate 22, and the upper end of a conical bore in cone support 5.

Barrel 12, pump 2, plate 22, cone support 5, and spinnerette 6 are surrounded by heating chamber 7 filled by about ⅔ to ¾ with a heat-transferring liquid 23 which is heated by electric heating elements 24 surrounding heating chamber 7. A vapor zone 25 is provided above liquid 23. Suitable means, not shown, are provided to releasably retain the elements in the arrangement shown in FIG. 1 within an insulation jacket 8. Cone 3 has straight convering grooves 4 on its outer periphery which provide the only communication from chamber 20 to chamber 26 which is located below cone 3 and above the spinnerette 6.

In extruder 10 a spinnable, highly-viscous polymer is molten and is conveyed to spinning pump 2 which presses the melt into the inventive apparatus consisting of truncated cone 3 with grooves 4, and conical support 5. In the apparatus the temperature of the flowing melt is raised by means of inner friction of the melt, and, finally, the melt is extruded through spinnerette 6. The temperature of the polymer is regulated by the temperature of the liquid 23 in heating chamber 7.

FIGS. 2 and 3 show different forms and arrangements of grooves on the outer surface of the cone. FIG. 2 shows the axial arrangement of the cone 3 in FIG. 1 on an enlarged scale wherein grooves 4 of a half-circular cross-section run straight from top to bottom of the cone 3. FIG. 3 shows cone 3' having grooves 4' in the form of a helix of different gradients having a rectangular cross-section. Straight grooves 4 according to FIG. 2 are easier to make then helix-type grooves 4' according to FIG. 3. However, helix-type grooves permit, at a given height of the cone, grooves of greater length.

The grooves 4 and 4' shall be uniformly distributed over the outer conical surface of the cones 3 and 3' and may have different dimensions, but shall have uniform cross-sections along their length. For filaments of textile and industrial deniers, rectangular grooves 4' having a width of 6 millimeters and a depth of 0.3 to 0.8 millimeter are preferred. With the apparatus having dimensions as described in the examples, pressure differences of about 300 to 1,100 atmospheres and temperatures rises of about 5° to 60° C. between chambers 20 and 26 can be obtained.

It may be mentioned that a pressure difference and rise of temperature of a flowing melt also occurs, if a melt under pressure flows through a sand bed of extreme fineness, different from the coarse sand used in conventional spinning pots. It is however known that the permeability of such fine sand beds quickly deteriorates due to clogging by tiny impurities in the polymer melt, such as, for example, gel particles. This was shown in a test extruding a polyethylene terephthalate melt and comparing, under otherwise equal conditions, a spinning head containing an apparatus according to the invention with a spinning head containing a fine sand bed of 10 millimeters height. The initial melt pressure was in both cases about 400 atmospheres. In the sand bed apparatus the pressure rose rapidly from the start reaching 1,100 atmospheres after 7 hours, when a safety valve switched off the spinning pump while in the apparatus of the present invention the pressure remained constant during 6 days.

The following examples will show details as to the performance of the inventive process by means of the inventive apparatus describing the melt-spinning of different polymers:

The intrinsic viscosity [η] of polyethylene terephthalate is defined by the following equation:

$$[\eta] = \frac{\sqrt{1+1.4\times\eta \text{ spec.}}-1}{0.35}$$

wherein η spec. means the specific viscosity at 25° C. of a solution of 0.5000 gram of polyethylene terephthalate in 100 milliliters of a mixture of equal parts by weight of phenol and tetrachloroethane.

The relative viscosity of polycaprolactam was determined in a solution of 5.5 grams of polycaprolactam in 50 milliliters of 90% formic acid at a temperature of 25° C. by means of an Ostwald Viscosimeter.

The pressure of the melt was determined by means of a pneumatic pressure meter after the melt had passed the spinning pump, i.e., before the entry to chamber 20. The pressure difference due to the effect of the apparatus of this invention is determined by the difference between the pressures measured with and without use of the cone 3, the pressure measured without cone 3 being due to the effect of the spinnerette 6 as explained above. As the measuring of the pressure due to the spinnerette 6 is, because of absence of the pressure due to the spinnerette 6 is, because of absence of the cone 3, made at a lower temperature than the measuring of the combined pressures due to cone 3 and spinnerette 6, the pressure due to the spinnerette 6 is found to be a little too high. By the method described, the pressure difference due to the cone 3 is therefore found to be a little too low. The error however does not exceed 2–3%.

Temperatures were determined by means of thermocouples (a) in the melt after the melt had passed the spinning pump, i.e. before the entry to chamber 20, and (b) in the spinnerette 6 by means of a bore hole made in the under-surface of the spinnerette. In comparative tests, under otherwise equal conditions, but with and without use of the cone 3, a rise of the spinnerette temperature, when using the cone 3, indicates that the temperature of the melt had increased by at least that amount.

The following examples exemplify the present invention and wherein the tenacities of the filaments were determined by the use of an Instron tester and refer to the filament denier at zero elongation:

EXAMPLE I

Polyethylene terephthalate of an intrinsic viscosity of 0.68 was extruded, using an apparatus as shown in FIG. 1. The cone and the conical support were made of stainless steel having, at 20° C., a heat conductivity of 0.035 gcal. per cm./sec./° C., the base of the truncated cone 3 had a diameter of 50 millimeters, and the taper or conge angle was 25°. The curved surface of the cone 3 contained 8 uniformly distributed axially grooves 4 running straight from top to bottom, each groove having a length of 45 millimeters, a width of 3 millimeters, and a depth of 0.4 millimeter. The spinnerette 6 had 34 holes, hole consisting of a channel of 7.83 millimeters length and 1.5 millimeters diameter followed by a capillary of 0.8 millimeter length and 0.4 millimeter diameter. The throughput was 37 grams per minute.

The liquid 23 in heating chamber 7 (FIG. 1) was heated to 265° C. After passing the spinning pump, before the entry to chamber 20, the melt temperature was 265° C., and the melt pressure was 330 atmospheres. The viscosity of the melt was 4,000 poises. The temperature of the spinnerette 6 was 275° C. In a comparative test, when the cone 3 was deleted, the melt pressure was 15 atmospheres, and the temperature of the melt before entry to chamber 20 and in the spinnerette 6 was 265° C. The pressure difference due to the effect of the cone 3 was therefore 330−15=315 atmospheres. The 10° C. higher temperature of the spinnerette 6 when using the cone 3, indicates that the temperature of the melt had increased by at least 10° C., but probably more, because some heat was consumed for increasing the temperature of the spinnerette 6.

Filaments were spun with and without use of the cone 3 and were wound-up at a speed of 400 meters per minute, giving spun multifilaments of a total denier of 840/34. Subsequently, the filaments were drawn at different draw ratios. Table 1 compares the tenacities and elongations of the drawn filaments:

TABLE 1

| Draw ratio | Filaments made with cone 3 | | Filaments made without cone 3 | |
| --- | --- | --- | --- | --- |
| | Tenacity (g./den.) | Elongation (percent) | Tenacity (g./den.) | Elongation (percent) |
| 4.6 | 5.0 | 17 | 3.9 | 10 |
| 5.2 | 5.8 | 11 | 4.8 | 6 |
| 5.5 | 6.4 | 8 | 5.3 | 5.5 |
| 5.8 | 7.2 | 7 | 5.8 | 5 |

The intrinsic viscosity of all filaments was the same as that of the polymer used.

Table 1 shows that the filaments made with use of the cone 3 had considerably higher tenacities and elongations than the filaments made without use of the cone 3. This is due to the rise of the temperature of the melt while passing through the cone 3, and the higher melt temperature produced a lower melt viscosity and therefore a lower pre-orientation of the filaments.

EXAMPLE II

Polyethylene terephthalate of an intrinsic viscosity of 0.95 was extruded using an apparatus as shown in FIG. 1. The cone and the conical support were made of stainless steel having, at 20° C., a heat conductivity of 0.035 gcal. per cm./sec./° C., the base of the cone 3 had a diameter of 65 millimeters, and the taper or cone angle was 30°. The outer surface contained 12 uniformly distributed axial grooves 4 running straight from top to bottom, each groove having a length of 47 millimeters, a width of 6 millimeters, and a depth of 0.4 millimeter. The spinnerette 6 had 96 holes, each hole consisting of a channel of 38 millimeters length and 2.4 millimeters diameter followed by a capillary of 0.6 millimeter length and 0.4 millimeter diameter. The throughput was 110 grams per minute. Filaments were spun using melts of different temperature produced by varying the temperature of the liquid 23 in the heating chamber 7. As the polymer used had a considerably higher viscosity than the polymer used in Example I, the melt had to be heated to substantially higher temperatures than the melt of Example I.

Tests were made supplying melts of different temperature and applying different melt pressures with and without use of the cone 3. Table 2 shows the results:

TABLE 2

| Melt supplied | | Melt pressure (atm.) | | | Spinnerette temperature (° C.) | | |
|---|---|---|---|---|---|---|---|
| Temperature (° C.) | Viscosity (poises) | With cone 3 | Without cone 3 | Difference due to cone 3 | With cone 3 | Without cone 3 | Difference due to cone 3 |
| 298 | 7,500 | 1,050 | 48 | 1,002 | 335 | 292 | 43 |
| 316 | 5,400 | 800 | 40 | 760 | 338 | 311 | 27 |
| 332 | 4,000 | 550 | 35 | 515 | 339 | 325 | 14 |
| 345 | 3,000 |  | 30 |  |  | 337 |  |

Table 2 demonstrates that, starting from melts of the same temperature, the temperatures of the spinnerette 6, when using the cone 3, were 14°, 27°, and 43° C., respectively, higher than without use of the cone 3. This indicates that the temperature of the melt flowing through the cone 3 had increased by at least the same temperatures, but probably more, because some heat was consumed for increasing the temperature of the spinnerette 6. Table 2 further shows that the temperature increase of the melt considerably rises with rising melt pressures.

To obtain satisfactory filaments free from any melt fracture phenomena without use of the cone 3, the melt supplied required a temperature of 345° C., while with use of the cone 3, the melt had only to be heated to temperatures of 298°, 316°, or 332° C., respectively, the temperature difference being supplied by the effect of the cone 3.

EXAMPLE III

Polycaprolactam of a relative viscosity of 65 was extruded using an apparatus as described in Example I with the following differences: By increasing the temperature of the liquid 23 in the heating chamber 7, the temperature of the melt supplied to chamber 20 was varied, and the spun filaments were drawn at a fixed draw ratio of 5.2 giving multifilaments of a total denier of 160/34. In a comparative test, filaments were spun and drawn under the same conditions, but deleting the cone 3. Table 3 shows the tenacities, elongations, and relative viscosities of the drawn filaments obtained:

TABLE 3

| Melt supplied | | Filaments made with cone 3 | | | Filaments made without cone 3 | | |
|---|---|---|---|---|---|---|---|
| Temperature (° C.) | Viscosity (poises) | Tenacity (g./den.) | Elongation (percent) | Relative viscosity | Tenacity (g./den.) | Elongation (percent) | Relative viscosity |
| 260 | 2,700 | 9.7 | 12.7 | 67.8 | 9.1 | 12.7 | 67.4 |
| 280 | 1,800 | 9.7 | 15.2 | 67.6 | 9.3 | 13.6 | 67.1 |
| 300 | 1,300 | 9.4 | 16.8 | 66.3 | 9.1 | 14.2 | 66.8 |

The higher tenacities of the filaments made with use of the cone 3 indicate that the extruded filaments had a higher temperature and therefore a lower pre-orientation than the filaments made without use of the cone 3.

The present invention may be embodied in other specific forms without departing from the spirit or essential attributes thereof and, accordingly, reference should be made to the appended claims, rather than to the foregoing specification as indicating the scope of the invention.

We claim:

1. Process for continuous extrusion of high-viscous thermoplastic polymer melts suitable for melt spinning without substantial degradation, wherein the temperature of the flowing melt is raised before extrusion by increasing the inner friction of the melt, which comprises passing said melt having a viscosity of at least 1000 poises, immediately before extrusion, through narrow channels which are straight or slightly curved and have a uniform cross section along their lengths, the radius of curvature of any curves formed by the channels being, at any point of said curves, at least ten times the width of the channels, under such conditions that the pressure of the melt at the entry to the channels is 300 to 1100 atmospheres higher than the pressure of the melt at the exit of the channels, increasing the temperature of the melt by internally generating heat in the melt which heat is substantially retained by the melt while flowing through the channels, and immediately thereafter extruding the melt while the melt is at the increased temperature.

2. A process in accordance with claim 1 which comprises feeding a polymer to the heated barrel of a screw extruder wherein the polymer is preplasticized and liquefied, discharging the thusly processed polymer into the inlet of a pump, and discharging the liquid polymer from the pump to the entry of said channels, and said step of extruding the melt including producing filaments of the polymer.

3. A process in accordance with claim 1 including using a truncated cone having said channels on a surface thereof in a manner so that flow is toward the small end of the cone, and using a cone whose specific heat conductivity does not exceed 0.06 gcal. per cm./sec./° C. at a temperature of 20° C. so that it does not absorb any appreciable heat from the melt.

4. A process in accordance with claim 3 wherein the length of the channels exceeds a transverse dimension of the channels by a factor 25 to 180.

5. A process in accordance with claim 3 including increasing the temperature of said melt of spinnable polymers from 5° to 60° C. during flow of the melt through said channels without adding heat thereto from an external source.

6. In an apparatus for the continuous extrusion of highly-viscous thermoplastic polymer melts suitable for melt spinning without substantial degradation, including extrusion means for forming a polymer melt, pump means for conveying and pressurizing said melt, and orifice means through which said melt may be extruded, the improvement comprising means for raising the temperature of said melt immediately before extrusion through said orifice means by increasing the inner friction of the melt, said temperature raising means being located intermediate said pump and said orifice means and comprising a truncated cone with its base toward the pump and having straight or slightly curved grooves of uniform cross section along their lengths running from top to bottom on a surface of said cone, the radius of curvature of any curves formed by the grooves being, at any point of said curves, at least ten times the width of the grooves, the cone being coaxial with a mating surface on a support, said mating surface fitting tightly to the cone surface leaving only the grooves free for passage of a flowing melt, the cone and the support being made of a material which has a specific heat conductivity not exceeding 0.06 gcal. per cm./sec./° C. at a temperature of 20° C., whereby the temperature of said melt is raised by inner friction as the melt passes through said grooves.

7. Apparatus in accordance with claim 6 wherein the cone support surrounds the cone, and the mating surface on the support being a conical bore juxtaposed to the grooves which are on the outer peripheral surface of said cone.

8. Apparatus in accordance with claim 6 including means defining a high pressure chamber of 300 to 1100 atmospheres communicating with the base end of said grooves, means defining a spinnerette chamber communicating with the other end of the grooves, and a spinnerette adjacent the spinnerette chamber, said spinnerette having passages communicating at one end with the spinnerette chamber and at their other end with the atmosphere.

9. Apparatus in accordance with claim 6 wherein the grooves are rectangular in cross section.

10. Apparatus in accordance with claim 6 wherein said cone has a taper or cone angle of at least 25°.

11. Apparatus in accordance with claim 6 wherein the grooves are uniformly distributed over the conical surface of the cone.

References Cited

UNITED STATES PATENTS

| Number | Date | Name | Class |
|---|---|---|---|
| 2,171,095 | 8/1939 | Orsini | 264—75 |
| 2,174,779 | 10/1939 | Delorme | 264—75 |
| 3,197,533 | 7/1965 | Robinson et al. | 264—176 R |
| 3,479,692 | 11/1969 | Biggelaar | 18—85 F |
| 3,506,753 | 4/1970 | Hammond | 264—176 F |
| 3,524,221 | 8/1970 | Jones | 18—85 F |
| 2,469,999 | 5/1949 | Stober | 264—176 F |
| 3,130,448 | 4/1964 | Tomlinson | 264—176 F |
| 3,457,342 | 7/1969 | Parr et al. | 18—85 F |
| 3,360,597 | 12/1967 | Jones et al. | 264—176 F |
| 3,480,706 | 11/1969 | Carpenter et al. | 264—176 F |
| 3,499,952 | 3/1970 | Kolner et al. | 264—176 F |
| 3,171,160 | 3/1965 | Moyer | 425—207 |
| 3,480,997 | 12/1969 | List | 425—207 |

FOREIGN PATENTS

| Number | Date | Country | Class |
|---|---|---|---|
| 618,663 | 3/1961 | Italy | 264—176 F |
| 1,023,888 | 9/1961 | Great Britain | 264—328 |

JAY H. WOO, Primary Examiner

U.S. Cl. X.R.

264—349; 425—198, 207, 382.2